United States Patent [19]

Brown

[11] Patent Number: 5,697,650
[45] Date of Patent: Dec. 16, 1997

[54] CORROSION-FREE CLIP EYELET FOR SPRAY NOZZLES

[75] Inventor: Wade R. Brown, St. Charles, Ill.

[73] Assignee: Spraying Systems Co., Wheaton, Ill.

[21] Appl. No.: 425,819

[22] Filed: Apr. 20, 1995

[51] Int. Cl.$^6$ .................................................. F16L 41/12
[52] U.S. Cl. ............................ 285/197; 285/367; 285/373; 411/537
[58] Field of Search ............................... 285/197, 199, 285/367; 284/419, 373; 411/366, 908, 904, 537, 427

[56] References Cited

U.S. PATENT DOCUMENTS

| | | | |
|---|---|---|---|
| 4,527,745 | 7/1985 | Butterfield et al. | 239/600 |
| 4,915,305 | 4/1990 | O'Brien et al. | 239/550 |
| 5,143,298 | 9/1992 | Prokopoff | 239/494 |

OTHER PUBLICATIONS

Catalog 70, TeeJet ® Spray Products, front and back cover and pp. 25–29, Copyright 1989 Spraying Systems Co.

*Primary Examiner*—Terry Lee Melius
*Assistant Examiner*—Heather Shackelford
*Attorney, Agent, or Firm*—Leydig, Voit & Mayer, Ltd.

[57] ABSTRACT

An all plastic spray nozzle attachment is provided to avoid corrosion problems, with a self-adjusting fastener system which minimizes or avoids bending stresses on the securement screw that joins the free ends of the two hinged clamp arms that embrace the support pipe. Both the head and nut ends of the screw and the respective abutting surfaces of the clamp arms are provided with arcuate abutment surfaces which permit rocking movement of the head and nut portions about axes generally parallel to the longitudinal axis of the support to readily maintain the head and nut in coaxial alignment with one another, thereby relieving bending stresses on the screw shank as the fastener is tightened to draw the arms toward one another into clamped position.

16 Claims, 9 Drawing Sheets

5,697,650

1

CORROSION-FREE CLIP EYELET FOR SPRAY NOZZLES

FIELD OF THE INVENTION

The present invention relates to clamps and, more particularly, to clamps which are used for supporting spray nozzles on a pipe in, for example, spray washing facilities. Such clamps are sometimes referred to as hinged split eyelets.

BACKGROUND OF THE INVENTION

In commercial spray washing facilities, clamps commonly are used to support spray nozzles at spaced intervals along a pipe or boom. Such clamps commonly are formed of metal parts and can become corroded after long exposure to the spray liquids. Corrosion problems become more severe in spraying operations in which chemicals are used with the washing liquid.

Because of such corrosion problems, the need has existed for clamps made with non-metallic, corrosion-resistant parts. Using plastic or similar corrosion-resistant material for the fastening screw which secures the arms of the clamp about the supply pipe, however, has not been suitable. Because the clamps are used for different sized supply pipes, the fastening screw which retains the arms in secured relation about the supply pipe may be subjected both to axial stress and to bending stress. These stresses are algebraically additive in creating tensile stress in the shank of the screw.

OBJECT AND SUMMARY OF THE INVENTION

A primary aim of the present invention is to provide an improved spray nozzle supporting clamp which is made entirely of non-metallic, corrosion-resistant components.

A related key object of the invention is to minimize or eliminate bending stresses in the clamping screw of such a support clamp, thereby requiring only the axial stresses necessary to draw the clamp arms into firm clamping engagement with a support member.

Another object is to provide a clamp as characterized above which utilizes both plastic clamp arms of fixed configuration and a plastic screw assembly which is adapted for reliable and secure retention of the clamp arms about a pipe even though the pipes may vary in diameter.

A further object is to provide a clamp of the foregoing type in which the screw is subjected substantially only to axial forces regardless of the size of the pipe with which the clamp is to be used and regardless of the use of relatively rigid clamp sections which retain their predetermined configurations, and hence regardless of whether the arms of the clamp are in parallel relation to each other as the clamp is tightened to its fully seated position.

Yet another object is to provide a clamp of the foregoing type which can be easily mounted without cumbersome handling of the fastening elements.

These and other objects and advantages of the invention will become more apparent from the following detailed description when taken in conjunction with the accompanying drawings.

2

Figure 2:
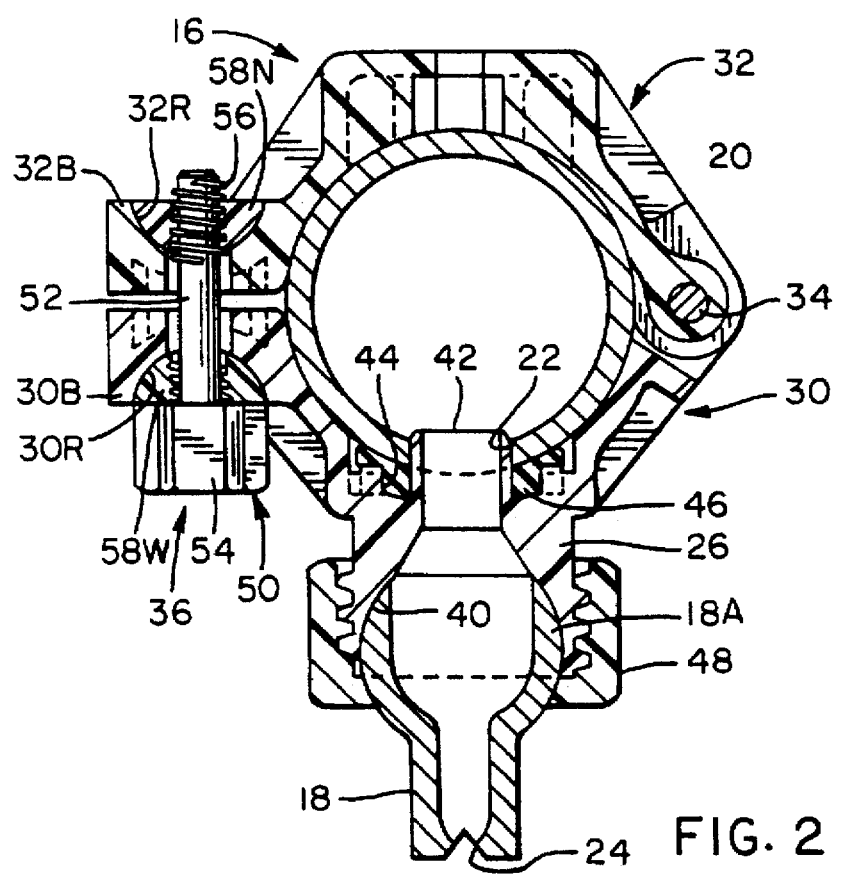
FIG. 2 is an enlarged fragmentary cross-section taken substantially along the line 2—2 of FIG. 1.
Figure 3:
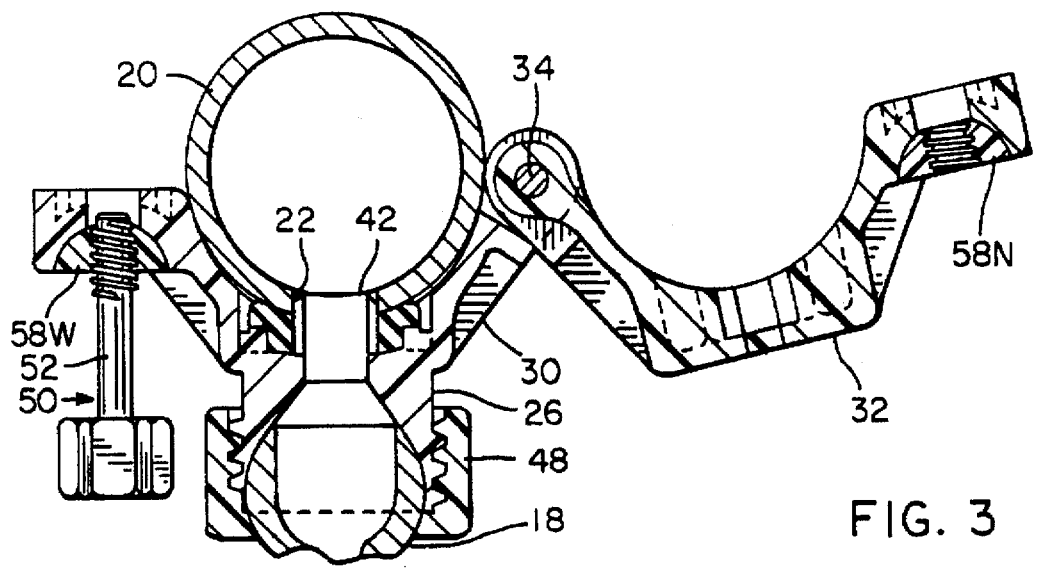

FIG. 3 is a view corresponding to FIG. 2, with the upper clamp arm open.

Figure 1:
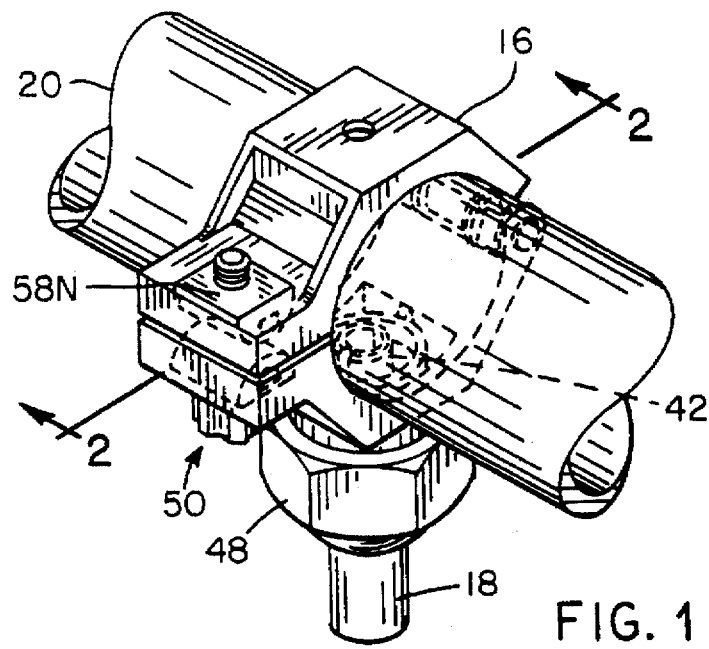
FIG. 1 is a perspective view showing a typical spray nozzle mounted on a pipe by a new and improved clamp incorporating the unique features of the present invention.
Figure 4:
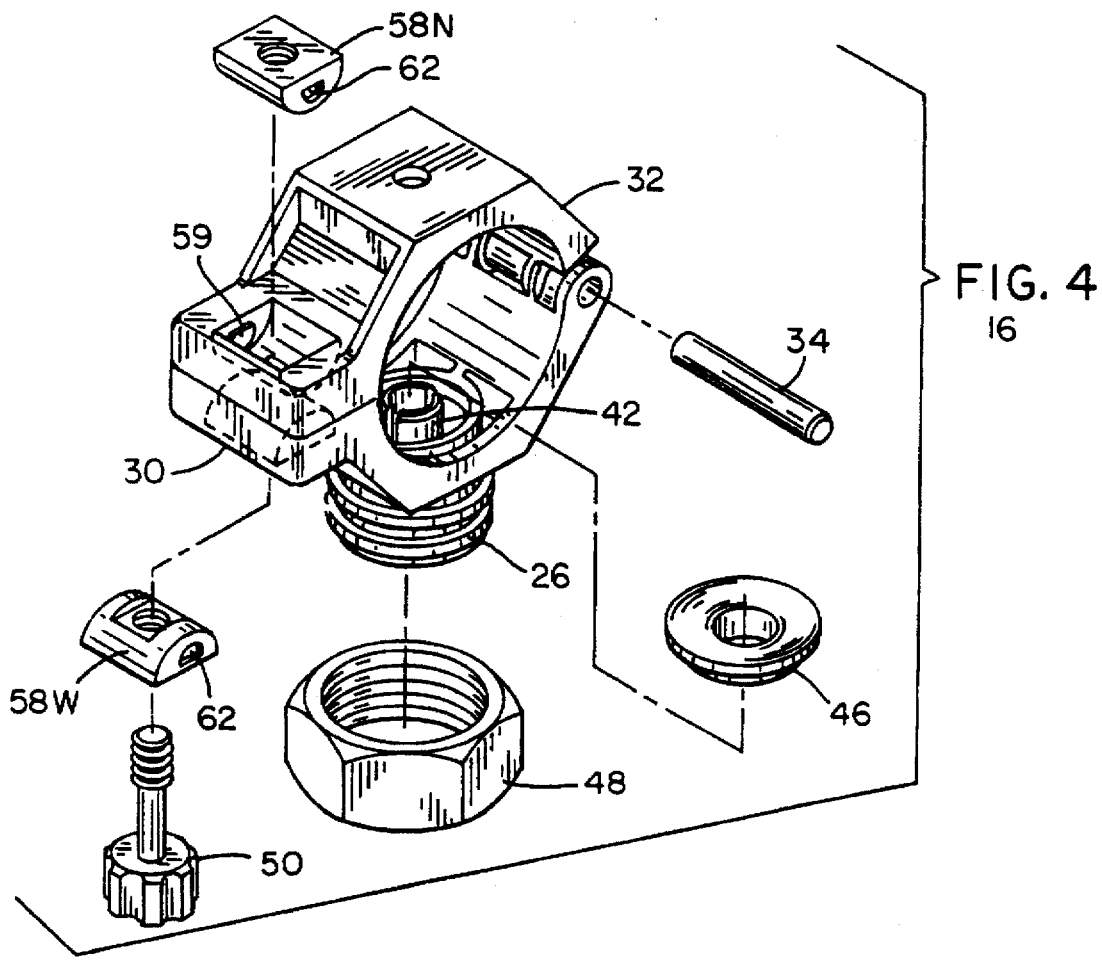

FIG. 4 is a partially exploded view of the hinged clamp eyelet assembly of FIGS. 1–3.

Figure 5:
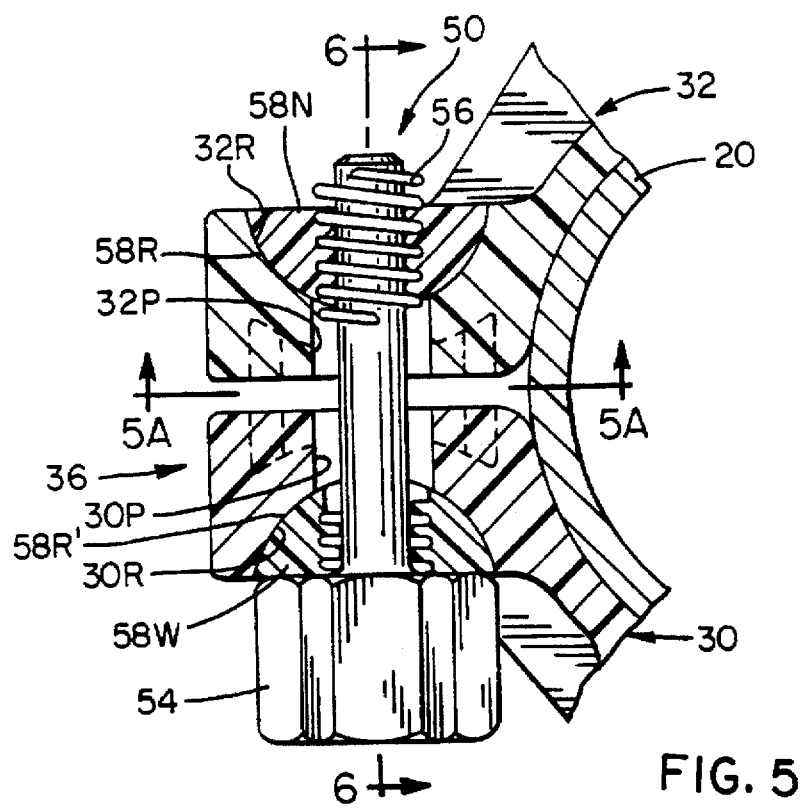

FIG. 5 is an enlarged partial view as in FIG. 2, illustrating the plastic threaded fastener holding the clamp arms in their closed position, such as for mounting a spray nozzle attachment on a support pipe as in FIGS. 1–3.

Figure 5A:
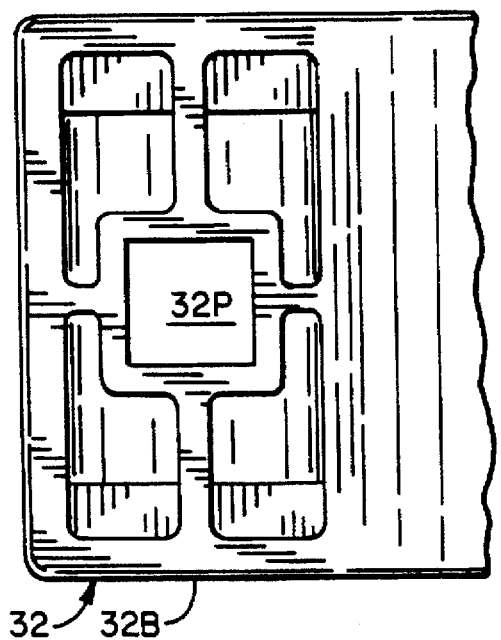

FIG. 5A is a bottom view of the free end portion of the top clamp arm, taken generally along line 5A—5A in FIG. 5.

Figure 6:
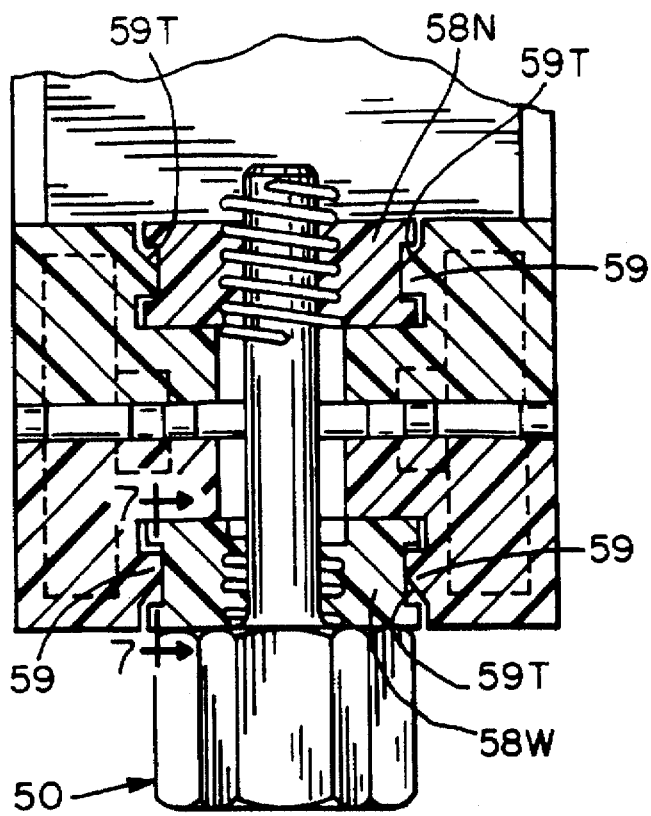

FIG. 6 is a sectional view, taken generally along lines 6—6 of FIG. 5.

Figure 7:
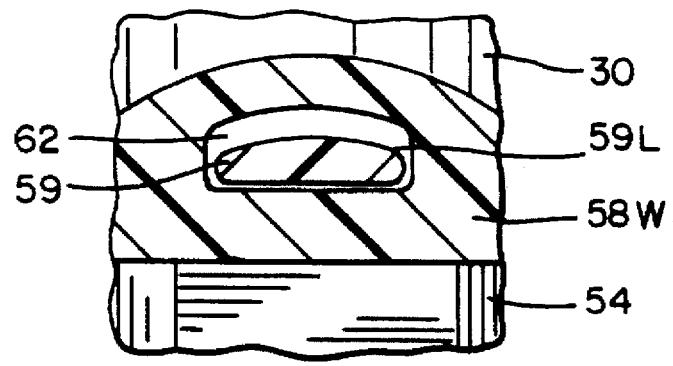

FIG. 7 is an enlarged schematic partial sectional view taken generally along lines 7—7 of FIG. 6.

Figure 8:
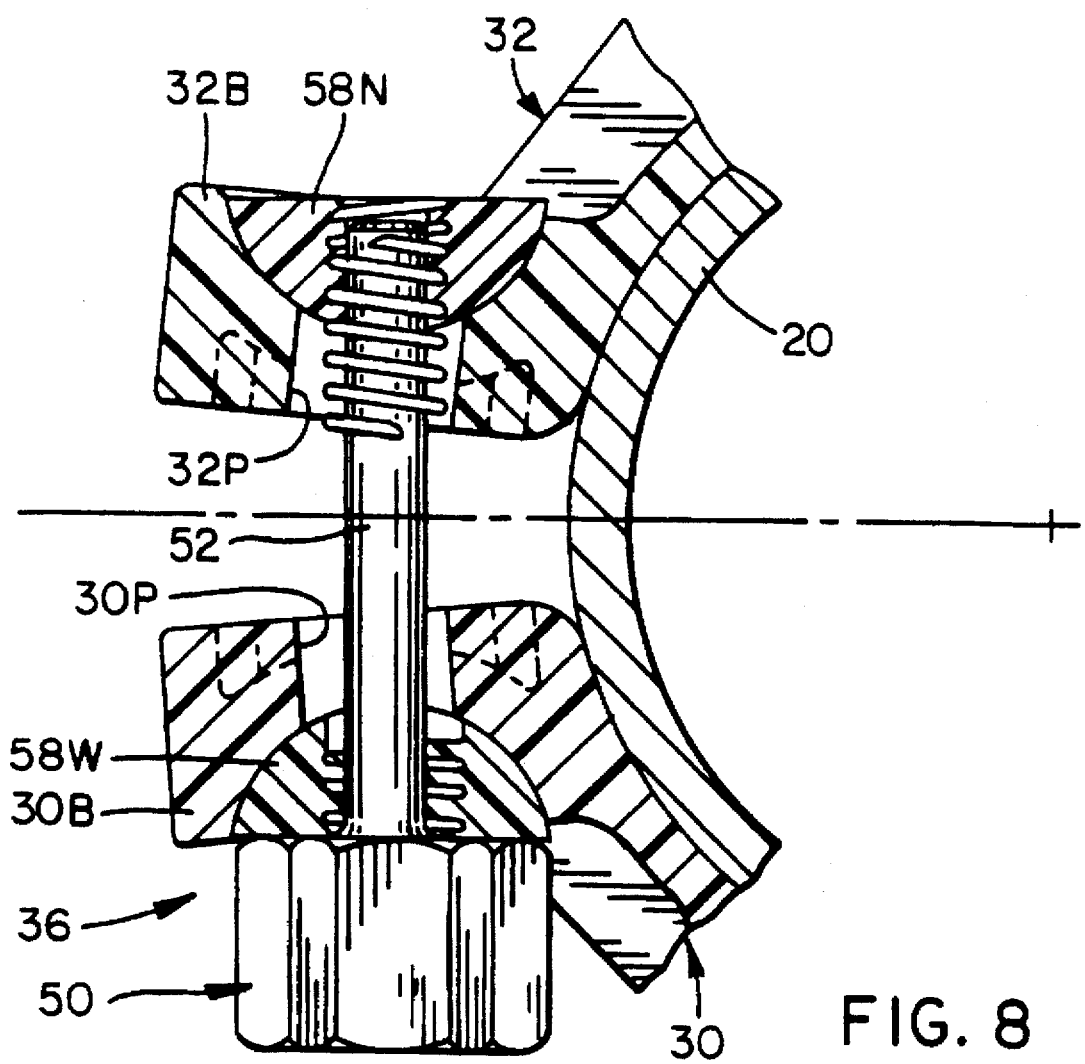

FIG. 8 is a view similar to FIG. 5, illustrating the attachment device in engagement with an oversized pipe.

Figure 9A:
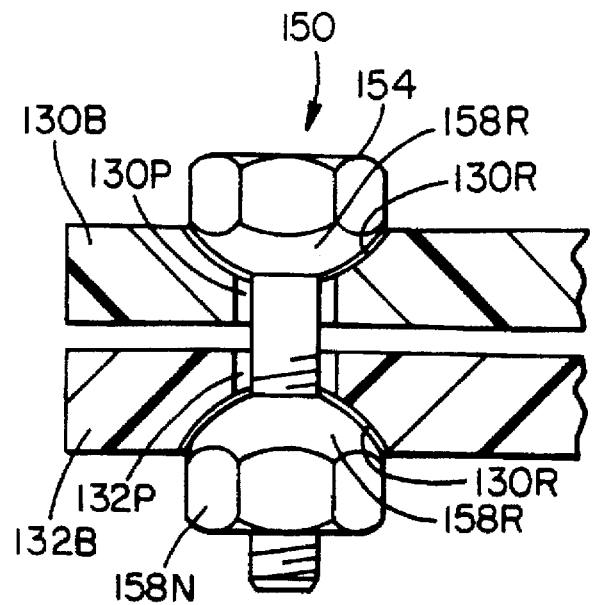
Figure 9B:
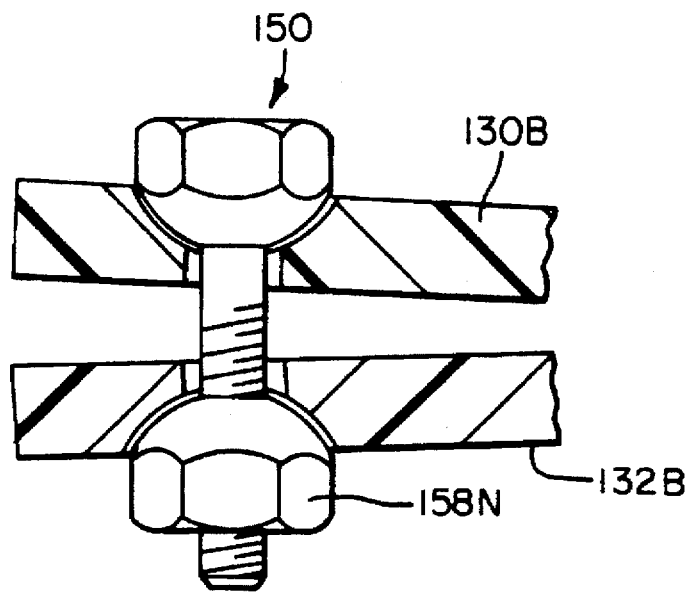

FIGS. 9A and 9B are enlarged schematic partial sectional views, generally similar to FIGS. 5 and 8, and which illustrate another embodiment of a hinged split eyelet using a plastic threaded fastener and which employs teachings of this invention.

FIGS. 10A and 10B, FIGS. 11A and 11B and FIGS. 12A and 12B are enlarged partial sectional views, generally similar to FIGS. 9A and 9B and which illustrate three further embodiments with plastic threaded fasteners and which employ teachings of this invention.

Figure 11A:
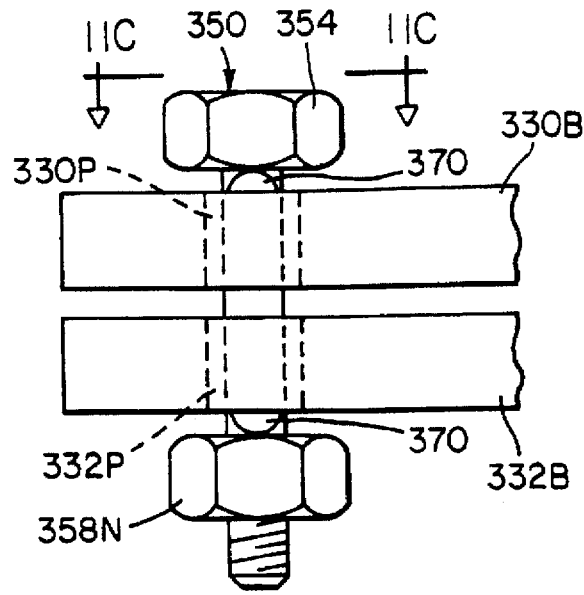
Figure 11B:
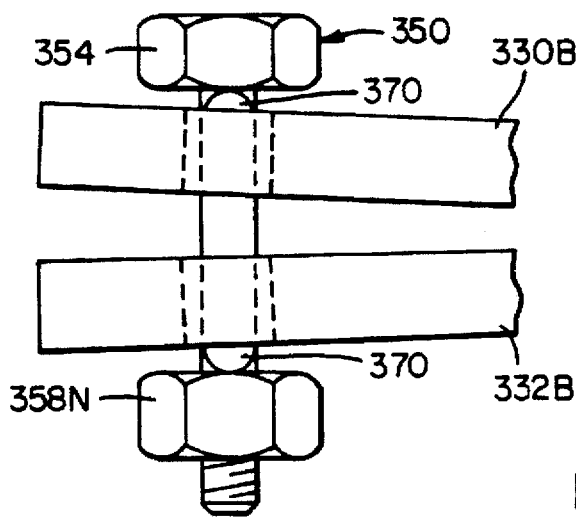
Figure 11C:
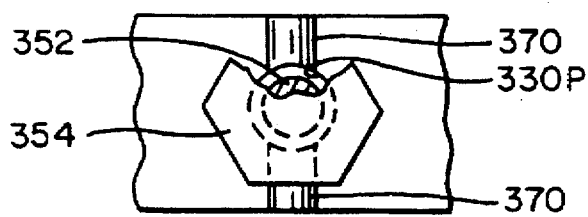

FIG. 11C is a partial top view taken along line 11C—11C of FIG. 11A.

Figure 12A:
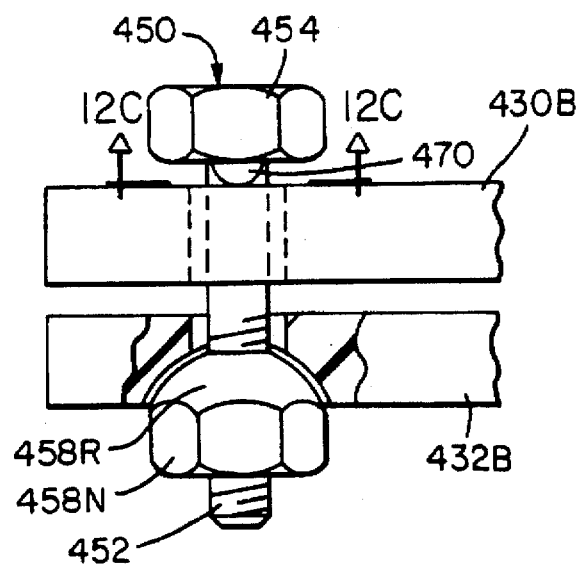
Figure 12B:
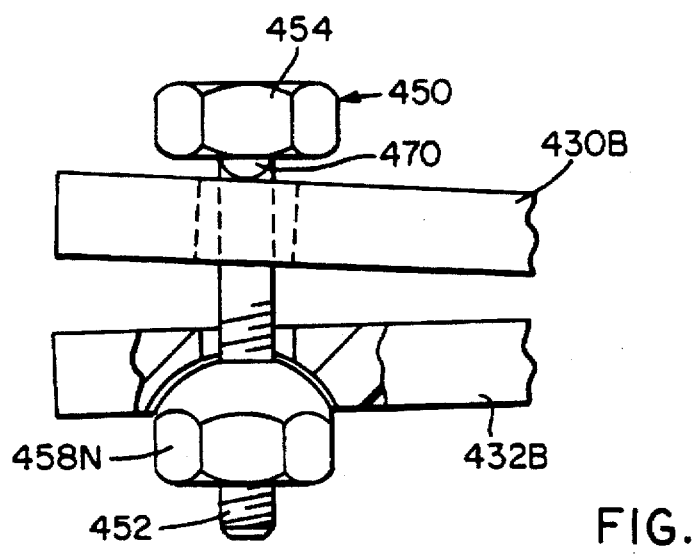
Figure 12C:
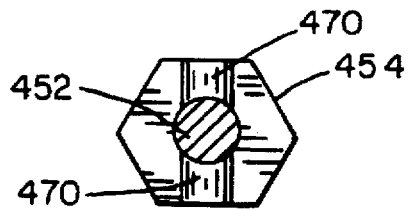

FIG. 12C is a view of the underside of the head of the attachment screw of FIGS. 12A and 12B taken along line 12C—12C of FIG. 12A.

While the invention is susceptible to various modifications and alternative constructions, a preferred embodiment and certain further embodiments have been illustrated in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENT

As shown in the drawings for purposes of illustration, the invention is embodied in a hinged split eyelet clamp 16 for mounting a fluid spray nozzle 18 on an elongated and generally cylindrical supply pipe 20. In a typical application, several nozzles are similarly mounted in a spaced array along the pipe. By way of examples, such arrangements may be used to spray-wash newly manufactured parts that may be coated with oil, plating solutions or the like, or to spray-clean molds or moldings, or to apply agricultural chemicals through spray booms and multiple nozzles. The liquids being sprayed often contain chemicals which are likely to increase the corrosive effect on metal which is exposed to the sprays over a prolonged time period.

The pipe 20 serves as a supply conduit for the fluid which is to be supplied by spraying. The pipe also may serve a support function, such as also constituting a relatively rigid spray boom, or may be supported on other adjacent structures, in a known matter. Lateral openings 22 are provided through the pipe wall, with these openings either being preformed or drilled at the installation site, to provide fluid communication to lateral devices such as the illustrated spray nozzles 18 or lateral conduits. The pipe 20 may be formed of any material suitable for obtaining the beam and hoop strength required while being resistant to the corrosive effects of the materials to be applied, e.g. being formed of plastic or of suitable metal. Similarly, the nozzles 18 may be of plastic or suitable metal materials, such as brass, with appropriate outlet openings 24 to effect the desired spray patterns.

To provide convenient, simple and secure mounting attachment of a lateral spud conduit section 26 and related nozzle 18, each clamp 16 includes a pair of clamping arms 30, 32 which are pivotally joined to one another at one end, as by a hinge pin 34. A quick-attachment assembly 36 is provided for conveniently drawing the free opposite ends of the arms toward one another to effect secure clamping engagement of the eyelet on the pipe 20. Thereby the entire nozzle assembly which comprises the clamp 16, lateral conduit 26 and nozzle 18 is firmly secured to the pipe 20 with the lateral conduit portion in sealing engagement with the pipe wall around the respective opening 22.

To provide corrosion resistance as well as structural rigidity and strength, the clamp arms 30 and 32 preferably are formed of appropriate structural plastics, such as polypropylene, as by molding. Each of the arms includes a hinge end section 30A, 32A, respectively, of appropriate designs to interfit with one another, e.g. as seen in FIGS. 2, 3 and 4. An aligned opening through these interfitting portions receives the hinge pin 34 for free hinging movement of the two clamping arms, such as between a fully open position as illustrated in FIG. 3 and clamping positions as illustrated in FIGS. 1, 2, 5 and 8. The pin 34 also may be formed of plastic, e.g. polypropylene. The arms 30 and 32 further include free end sections 30B, 32B of appropriate configurations for reception of clamping securement fasteners as will be described further below. Each of the clamp arm portions between the free and hinge end portions is of appropriate configuration for embracing the support pipe 20, being of arcuate internal surface configurations corresponding generally to the peripheral surface of the pipe 20. Each of the arms is of appropriate detailed sectional configuration, including webs and flanges as appropriate, to provide substantial strength and rigidity of each clamp arm such that each arm will maintain its integrity and predetermined configuration to withstand the stresses of clamping engagement on the support pipe 20 with minimal strain.

The arm 30 is of a configuration to assure effective sealing engagement of the sealing components over and around the opening 22. It includes the connector spud 26 with an integral insert sleeve section 42 to project into the opening 22 and defines a surrounding annular pocket 44 to receive a sealing ring 46 for effecting fluid sealing engagement between the arm 30 and a conduit wall around the opening 22. To this end the ring 46 is of an appropriate resilient material, such as ethylene propylene rubber. The outer end of the connector spud 26 is of an appropriate internal configuration, e.g. a spherical socket 40, for close swivel engagement with the inlet end 18A of the nozzle 18. An annular retaining cap 48 threadably engages the spud 26, as illustrated, and includes a center opening of lesser diameter than the maximum diameter of the inlet section 18A to effect sealing retention of an appropriate nozzle 18 or other fluid conduit element.

To further avoid corrosion problems, the fastener assembly 36 preferably is formed of plastic components. Further, it is of a design to minimize or avoid bending stresses on the shaft 52 of the clamping screw 50, that is, to assure that substantially all of the applied stresses are only the axial stresses required to draw the opposing free ends 30B, 32B together when effecting the desired clamping engagement of the assembly 16 on the support 20. The screw 50 is an integral plastic component, such as of polypropylene, including the shank 52 with a head 54 on one end and appropriate screw threads on the distal end portion 56. Potential bending stresses on the shank 52 are minimized by providing rocking engagement between each end of the screw and the respective free ends 30, 32 of the clamp arms.

In the preferred embodiment of FIGS. 1–8, the desired relative rocking motion as well as various assembly and use advantages are obtained by providing a cylindrical concave recess or "pocket" 30R, 32R in the outer side of each of the free ends 30B, 32B of the clamp arms 30, 32. The longitudinal axes of these cylindrical concavities are parallel to the axis of the opening defined by the clamp arms 30, 32 when closed, and thus are parallel to the longitudinal axis of the engaged portion of the support 20. A plastic nut 58N is formed with a cylindrical convex surface 58R which is complementary to the concave surface 32R. A plastic thrust washer 58W is of a similar configuration, having a convex surface 58R' which similarly mates with the concave surface 30R. In this preferred embodiment, the nut 58N and thrust washer 58W each have internal threads for threadable passage of the threaded portion 56 of the shank through the thrust washer 58W and threaded engagement of that portion 56 in the nut 58N. The portion of the shank 52 between the screw head 54 and the threaded portion 56 is of a diameter equal to or less than the minor diameter the threads in the element 58W. Accordingly, threading of the screw through the element 58W serves to retain those parts in loosely assembled relationship.

For simplicity, the parts 58N and 58W preferably are of identical design and size. Further, in the preferred embodiment, provision is made for snap assembly and retention of the nut and washer components 58N, 58W in the respective clamp arms 30 and 32. As perhaps best seen in FIGS. 4, 6 and 7, this retention is accomplished by providing a recess 62 in each end face of each element 58N, 58W, and a somewhat smaller shallow generally semicircular or "moon shaped" projection 59 on each end face of each of the pockets 30R, 32R. The end surfaces of the elements 58N, 58W and the pockets 58R are essentially parallel, lying in planes normal to the rocking axis of the elements 58N, 58W. The components are dimensioned for compressive snap engagement of the projections 59 into the recesses 62. The recesses are somewhat larger than the projections and the projections have arcuate edges 59L to allow for the relative rocking motion between the elements 58N, 58W and the arms 30, 32. Also, the projections 59 are tapered in thickness at 59T, as viewed along a radius of the respective element, to facilitate insertion into the pockets.

Passages 30P, 32P extend through the respective free end portions of the clamp arms to accommodate free passage and lateral tilting movement of the screw shanks 52. As best seen in FIG. 5A, these openings are rectangular and defined by structural flanges of the respective arm, being of substantially larger cross-section than the shanks to allow the relative rocking motion between the shanks 52 and the respective arms attendant upon the relative angular movement of the plastic fastener assembly 36 relative to the arms, e.g. as seen in FIG. 8.

In use, the attachment 16 may be preassembled by snapping the elements 58N and 58W into the pockets of the respective arms 30 and 32. The screw 50 may be prethreaded through either of these elements whereby it is prepositioned for convenient availability and threading into the other element by the user when the attachment is applied to the support pipe 20. Of course, the direction of insertion of the screw also defines one of these elements as a thrust bearing and retaining washer, and the other element as the nut; either can serve either function in this embodiment. The sealing ring 46 is positioned in the recess 44 around the sleeve 42. The nozzle 18 or other element also may be preattached to the spud 26 or may be applied at another time, e.g. after the attachment 16 is affixed to the support pipe 20.

The subassembled attachment 16 is positioned against a pipe, generally as in FIG. 3, with the arm 30 and related spud engaging the pipe, and arm 32 open at least sufficiently to readily apply the device to the pipe. Arm 32 then is closed by the applicator and the screw 50 is threaded into the nut element 58N to complete the clamp sealing of the attachment 16 to the pipe. Due to variations in the diameter of pipes as well as the interfit of the various related components and the configuration of the arms 30 and 32, the free arm portions 30B, 32B may be in different angular (nonparallel) relationship to one another during various phases of the clamping action, and may remain nonparallel when fully seated in embracing relationship about the pipe 20, e.g. as in FIG. 8. It will be appreciated that if a conventional screw and nut were used for clamping purposes, i.e., having flat surfaces in fixed angular relation to the shank to engage with flat abutment surfaces of the arm portions 30B, 32B, any relative angular relationship between the opposite surfaces of the arms such as in FIG. 8 would result in the primary clamping forces being applied at the edges of the head and nut. This would result in bending moments applying bending stress to the shank and hence would cause tensile forces in portions of the shank in excess of the tensile forces necessary to the clamping function.

In the clamp 16, the shank passes through and thus remains aligned with the center of curvature of the washer 58W and the nut 58N. The cylindrical interfaces between the elements 58N, 58W and their respective pockets 30B, 32B, as well as the fact that the passages 30P, 32P are significantly larger than the shank 52, permit relatively free rocking adjustment movement of the elements 58N, 58W to maintain the openings therethrough in coaxial alignment with one another and to maintain the bearing contact interfaces substantially centered on the shank 52. This assures that the clamping forces are applied parallel to the longitudinal axis of the shank and substantially within its cross-section, and thereby minimizes or avoids bending stresses on the plastic screw 50. The positioning of the detent latch elements 59 and 62 as well as their configurations and the oversize of the recess relative to the detent accommodate this relatively rocking motion while providing the preassembly retention benefits noted above.

While the aforedescribed embodiment presently is preferred, it will be appreciated that rocking adjustment movement between the securement components in planes generally normal to the mounting axis of the attachment may be effected in a similar manner with attachment devices of other designs. Four such alternative embodiments are illustrated in FIGS. 9A–12C. Each of these illustrations includes only a schematic illustration of the securement portions of a nozzle attachment device which otherwise is assumed to be of the same or similar design as the preferred embodiment of FIGS. 1–8. In these additional embodiments, similar elements are given numbers corresponding to those used with respect to the embodiment of FIGS. 1–8 with a prefix number in the 100 series, 200 series etc.

In the embodiment of FIGS. 9A and 9B, the screw 150 includes a head 154 which is formed to include a cylindrically or spherically concave undersurface 158R centered thereon for matching engagement with a corresponding concave surface 130R in the outer side of the respective arm portion 130B and centered on the opening 130P. The nut 158N similarly is formed with a cylindrically or spherically convex surface 158R which fits in complementary engagement with a centered correspondingly concave surface 130R in the outer side of the arm portion 132B. If it is contemplated that the screw 150 is to be rotated for clamping purposes, then the convex inner surface thereon must be spherical and the concave surface of the nut may be either spherical or cylindrical, preferably being cylindrical for holding the nut against rotation. Conversely, if the nut is to be rotated for clamping purposes, then its inner surface must be spherical and the convex surface of the head may be either spherical or cylindrical.

Figure 10A:
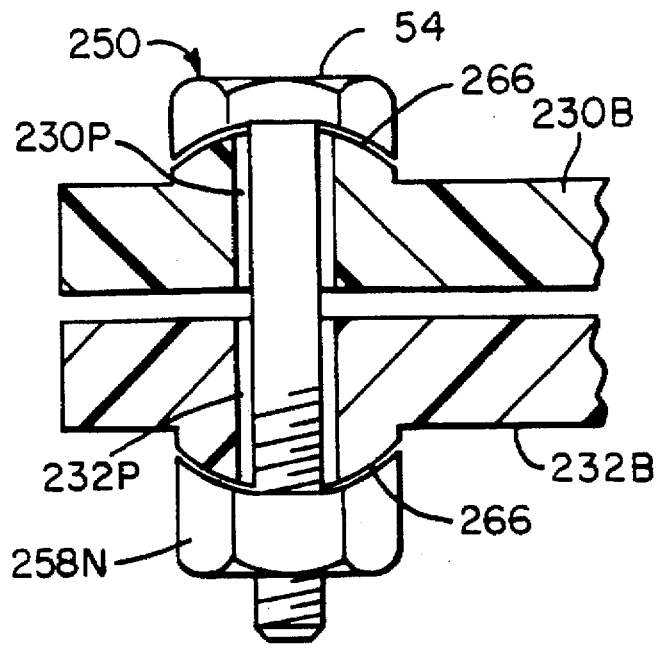
Figure 10B:
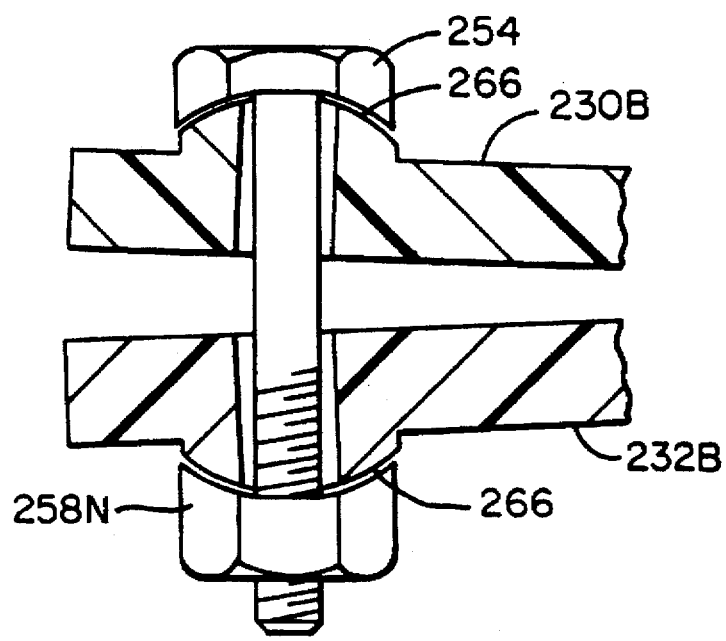

In the embodiment of FIGS. 10A and 10B, the free end portions 230B and 232B of the clamp arms are formed of configurations to provide convex outer surfaces 266 centered around the passages 230P, 232P. Correspondingly, the head 254 of the screw 250 and the nut 258N are formed with complementary concave inner surfaces. As in the case of the embodiment of FIGS. 9A and 9B, the fastener component which is to be rotated during the clamping action must be of a spherical configuration while the mating surfaces of the other component may be either cylindrical or spherical.

In the embodiment of FIGS. 11A, 11B, 11C, each of the arm portions 330B and 332B is formed with narrow ribs 370 on opposite sides of the respective passage 330P, 332P, with these ribs having arcuate outer surfaces and being axially aligned with one another along a line which is a diameter of the head 354 and of the nut 358N and generally parallel to the mounting axis of the attachment and thus parallel to the longitudinal axis of a support on which the attachment is mounted. In this embodiment, the screw 350 and the nut 358N (or a nut and washer at the position of the nut 358N) may have simple flat inner surfaces. Relative rocking motion between the threaded fastener and the arms may occur at the interface between the arcuate outer surfaces of the ribs 370 and the abutting surfaces of the fastener. However, it will be appreciated that this embodiment will result in substantially greater concentration of clamping forces at these interfaces than at the matching concave/convex surfaces of the embodiments described above. Further, the head 350 and nut 358N and/or an intervening washer must be of substantially larger diameter than the passages 330P, 332P to provide bearing surfaces on the ribs 370, and there will be slight shifting of the force application lines as the parts rock relative to one another.

In the embodiment of FIGS. 12A–12C, a pair of aligned narrow arcuate-surfaced diametral ribs 470 are provided on the inner surface of the head 454 of screw 450. Mating detents may be provided in the subjacent surface of the arm 430B, or other means may be provided, to maintain the screw 450 in position such that the ribs 470 remain aligned in a direction parallel to the mounting axis of the attachment. The nut 458N is formed with a centered spherical convex surface 458R which mates with a centered spherical concave surface in the outer side of the arm 432B, as described with respect to FIGS. 9A and 9B above. The described arrangement is on the assumption that the nut 458N is to be rotated to effect the clamping action. Alternatively, if the screw 450 is to be rotated and the nut held in a fixed position, ribs corresponding to ribs 470 could be provided on the inner face of the nut and a spherical interface provided between the head 454 and the arm portion 430B.

From the foregoing it can be seen that apparatus has been provided which accomplishes the aforenoted objects of this invention.

It will be understood that other variations and modifications and the substitution of equivalent mechanisms could be effected within the spirit and scope of this invention, particularly in light of the foregoing teachings. It is contemplated by the following claims to cover any such modifications and other embodiments that incorporate those features which constitute the essential features of the invention within the true spirit and scope of the following claims.

I claim:

1. A clamp for mounting a device on an elongated support having a longitudinal axis and a peripheral surface, said clamp comprising first and second rigid clamping arms each having free and hinge end portions and an intervening gripping portion which includes an interior surface of a configuration to engage a portion of said peripheral surface of said elongated support, said hinge end portions of said arms being pivotally joined to one another whereby said arms are pivotal about an axis generally parallel to the longitudinal axis of the support to be engaged therebetween for movement of said arms between open positions in which said arms may be installed over opposite sides of the elongate support and clamped positions in which the interior surfaces of the arms embrace the elongated support, a threaded plastic fastener including a head, a nut and an elongated shank for extending between said free end portions and for drawing said end portions toward one another into said clamped position and thereby affixing said clamp to said support, said shank having a longitudinal axis extending lengthwise through said shank, said nut having a threaded aperture and an integrally formed concave abutment surface, one of said free end portions having an opposed convex abutment surface shaped complementary to the abutment surface of said nut, said head and the other of said free end portions having complementary shaped and opposed curved abutment surfaces, and said abutment surfaces permitting rocking movement of said head and nut about axes generally parallel to said longitudinal axis of said support engaged between said arms while maintaining compressive bearing contact with one another substantially centered on said longitudinal axis of said shank notwithstanding that the diameter of the elongated support prevents positioning of said arms into parallel relation to each other and thereby relieving bending stresses on said shank as said threaded fastener is tightened to draw said arms toward one another.

2. A clamp for mounting a device on an elongated support having a longitudinal axis and a peripheral surface, said clamp comprising first and second rigid clamping arms each having free and hinge end portions and an intervening gripping portion which includes an interior surface of a configuration to engage a portion of said peripheral surface of said elongated support, said hinge end portions of said arms being pivotally joined to one another whereby said arms are pivotal about an axis generally parallel to the longitudinal axis of the support to be engaged therebetween for movement of said arms between open positions in which said arms may be installed over opposite sides of the elongate support and clamped positions in which the interior surfaces of the arms embrace the elongated support, a threaded plastic fastener including a head, a nut and an elongated shank for extending between said free end portions and for drawing said end portions toward one another into said clamped position and thereby affixing said clamp to said support, said shank having a longitudinal axis extending lengthwise through said shank, said head and nut each having a concave abutment surface, and said free end portions each having a convex abutment surface for opposing engagement with a respective one of said head and nut abutment surfaces for permitting rocking movement of said head and nut about axes generally parallel to said longitudinal axis of said support engaged between said arms while maintaining compressive bearing contact with one another substantially centered on said longitudinal axis of said shank notwithstanding that-the diameter of the elongated support prevents positioning of said arms into parallel relation to each other and thereby relieving bending stresses on said shank as said threaded fastener is tightened to draw said arms toward one another into said clamped positions.

3. The invention as in claim 2 wherein one of said convex shaped abutment surfaces is elongated with a major axis parallel to said longitudinal axis of said support and intersecting the longitudinal axis of the shank.

4. The invention as in claim 2 in which the concave abutments surfaces of said head and nut each are formed integrally with the respective head and nut.

5. A clamp for mounting a device on an elongated support having a longitudinal axis and a peripheral surface, said clamp comprising first and second rigid clamping arms each having free and hinge end portions and an intervening gripping portion which includes an interior surface of a configuration to engage a portion of said peripheral surface of said elongated support, said hinge end portions of said arms being pivotally joined to one another whereby said arms are pivotal about an axis generally parallel to the longitudinal axis of a support to be engaged therebetween for movement of said arms between open positions in which said arms may be installed over opposite sides of the elongate support and clamped positions in which the interior surfaces of the arms embrace the elongated support, a threaded plastic fastener including a head, a nut and an elongated shank for extending between said free end portions and for drawing said end portions toward one another into said clamped position and thereby affixing said clamp to said support, said shank having a longitudinal axis extending lengthwise through said shank, said head and nut and the respective free end portions having opposed abutment surfaces, and at least of one said abutment surfaces is defined by a narrow rib having a curved outer surface and the abutment surface opposing said narrow rib is substantially flat.

6. The invention as in claim 5 in which said narrow rib extends from an underside of said nut, and the opposing abutment surface of the free end portion is substantially flat.

7. The invention as in claim 6 in which said narrow rib is lesser in width than said head.

8. The invention as in claim 6 in which narrow rib extends from one of said free end portions.

9. The invention as in claim 6 in which the abutment surfaces of each of said free end portions is defined by one of said narrow ribs.

10. The invention as in claim 9 in which said narrow ribs each is smaller in width than the abutment surface of the opposing head and nut.

11. A clamp for mounting a device on an elongated support having a longitudinal axis and a peripheral surface, said clamp comprising first and second rigid clamping arms formed of plastic and each having free and hinge end portions and an intervening gripping portion which includes an interior surface of a configuration to engage a portion of said peripheral surface of such an elongated support, at least one of said arms being of a configuration for supporting a device to be mounted on such a support, said hinge end portions of said arms being pivotally joined to one another whereby said arms are pivotable about an axis generally parallel to the longitudinal axis of a support to be engaged therebetween for movement of said arms between open positions in which said arms may be installed over opposite sides of the elongate support and clamped positions in which the interior surfaces of the arms embrace the elongated support, and a plastic threaded fastener including a head portion, a nut portion and a shank to extend between said free end portions for drawing said end portions toward one another into said clamped position and thereby affixing said clamp to such a support, said shank having a longitudinal axis extending lengthwise of said shank, each of said head and nut portions and the respective free end portion having opposed abutment surfaces which permit rocking movement of said head and nut portions about axes generally parallel to said longitudinal axis of such a support engaged between said arms while maintaining compressive bearing contact with one another substantially centered on said longitudinal axis of said shank and thereby relieving bending stresses on said shank as said threaded fastener is tightened to draw said arms toward one another into said clamped positions said free end portions of said arms being formed with pockets, a bearing washer mounted on said shank adjacent said head portion, said bearing washer and nut portion being releasably received and held in respective of said pockets with a snap action fit, and said abutment surfaces are defined by concavely curved seats formed in the free ends of said arms and convexly curved surfaces of said nut portion and bearing washer adopted for rocking movement relative to said seats during tightening of said fastener.

12. The invention as in claim 11 in which said threaded fastener includes a screw comprising a head and said shank, and said washer is internally threaded and threadably receives said shank when said arms are in said open positions whereby said screw is retained in said washer without being engaged with said nut.

13. A clamp for mounting a spray nozzle on a generally cylindrical support pipe having a longitudinal axis, said clamp comprising first and second rigid clamping arms molded of plastic and each having free and hinge end portions and a generally arcuate interior surface, means on one of said arms for mounting a spray nozzle, plastic hinge means interconnecting said hinged end portions and supporting said arms to swing abut an axis paralleling said longitudinal axis between open positions in which the arms may be installed on the pipe and closed positions in which the interior surfaces of the arms clamp against the pipe, a first pocket having a concavely curved bottom formed in the exterior side of the free end portion of said first arm, a second pocket having a concavely curved bottom formed in the exterior side of the free end portion of said second arm, a plastic nut located in said first pocket, a plastic washer located in said second pocket, a plastic screw having an elongated shank extending through said washer for threading into said nut and having an enlarged head engageable with said washer, said nut portion and washer having convexly curved surfaces which rock on the bottoms of said pockets during tightening of said screw, said nut portion and washer being releasably retained in said pockets with a snap action fit while allowing said nut and washer to rock within said pockets about axes parallel to said longitudinal axis of said support during tightening of said screw to draw said arms toward said closed positions.

14. The invention as in claim 13 in which said washer is internally threaded and threadably receives said shank when said arms are in said open positions thereby to retain said screw in assembled relation with said second arm.

15. A spray nozzle attachment for use on an elongated support having a longitudinal axis and a peripheral surface, said attachment comprising first and second rigid plastic clamping arms each having free and hinge end portions and an intervening gripping portion which includes an interior surface of a configuration to engage a portion of said peripheral surface of such an elongated support, at least one of said arms being of a configuration for supporting such a spray nozzle, said hinge end portions of said arms being pivotally joined to one another whereby said arms are pivotable about an axis generally parallel to the longitudinal axis of such an elongated support to be engaged therebetween for movement of said arms between open positions in which said arms may be installed over opposite sides of the support and clamped positions in which the interior surfaces of the arms embrace the support, a plastic threaded fastener including a head portion, a nut portion and a threaded shank to extend between said free end portions for drawing said end portions toward one another into said clamped position and thereby affixing said clamp to such a support, said shank having a longitudinal axis extending lengthwise of said shank, a threaded washer threadedly engaging said shank and positioned in close relation to said nut portion, said nut portion being separate from said shank and threadedly positionable onto an end of said shank opposite said head portion, each of said washer and nut portion and the respective free end portions of said arms having opposed abutment surfaces which includes a convex surface engageable with an opposed surface to permit rocking movement of said washer and nut portions about axes generally parallel to the longitudinal axis of said support while maintaining compressive bearing contact with one another substantially centered on said longitudinal axis of said shank notwithstanding that the diameter of the elongated support prevents positioning of said arms into parallel relation to each other and thereby relieving bending stresses on said shank as said threaded fastener is tightened to draw said arms toward one another into said clamped positions.

16. A spray nozzle attachment for use on an elongated support having a longitudinal axis and a peripheral surface, said attachment comprising first and second rigid clamping arms each having free and hinge end portions and an intervening gripping portion which includes an interior surface of a configuration to engage a portion of said peripheral surface of such an elongated support, at least one of said arms being of a configuration for supporting such a spray nozzle, said hinge end portions of said arms being pivotally joined to one another whereby said arms are pivotable about an axis generally parallel to the longitudinal axis of such an elongated support to be engaged therebetween for movement of said arms between open positions in which said arms may be installed over opposite sides of the support and clamped positions in which the interior surfaces of the arms embrace the support, and a threaded fastener including a head portion, a nut portion and a shank to extend between said free end portions for drawing said end portions toward one another into said clamped position and thereby affixing said clamp to such a support, said shank having a longitudinal axis extending lengthwise of said shank, each of said head and nut portions and the respective free end portion having opposed abutment surfaces which include convex surfaces that permit rocking movement of said head and nut portions about axes generally parallel to said longitudinal axis of said support engaged between said arms while maintaining compressive bearing contact with one another substantially centered on said longitudinal axis of said shank and thereby relieving bending stresses on said shank as said threaded fastener is tightened to draw said arms toward one another into said clamped positions, one of said abutment surfaces being spherical in shape, and another of said abutment surfaces being cylindrical in shape and with an axis generally parallel to the longitudinal axis of the elongated support engaged by said clamping arms for limiting rotational movement of said one of said head portion and said nut portion relative to the longitudinal axis of the shank.

* * * * *